United States Patent
Walton et al.

(10) Patent No.: US 6,910,405 B2
(45) Date of Patent: Jun. 28, 2005

(54) ON/OFF SWITCH FOR LIQUID ADDITIVE INJECTION PUMP

(75) Inventors: Frank A. Walton, Fort Worth, TX (US); James E. Williams, Richardson, TX (US)

(73) Assignee: Dosmatic USA, Inc., Carrollton, TX (US)

( * ) Notice: Subject to any disclaimer, the term of this patent is extended or adjusted under 35 U.S.C. 154(b) by 34 days.

(21) Appl. No.: 10/615,273

(22) Filed: Jul. 8, 2003

(65) Prior Publication Data

US 2005/0005764 A1 Jan. 13, 2005

(51) Int. Cl.[7] ................................................. F04B 9/10
(52) U.S. Cl. ............................... 91/15; 91/322; 91/330; 91/331
(58) Field of Search ............................ 92/15; 91/322, 91/330, 331

(56) References Cited

U.S. PATENT DOCUMENTS

| | | | | |
|---|---|---|---|---|
| 3,228,560 A | * | 1/1966 | Tacchi | 417/375 |
| 3,610,264 A | * | 10/1971 | Flagg | 137/66 |
| 4,809,731 A | * | 3/1989 | Walton et al. | 92/60.5 |
| 5,137,435 A | * | 8/1992 | Walton | 91/229 |
| 5,513,963 A | * | 5/1996 | Walton | 91/227 |
| 5,951,265 A | * | 9/1999 | Bryant | 91/346 |
| 6,684,753 B1 | * | 2/2004 | Urrutia | 91/344 |

* cited by examiner

Primary Examiner—Edward K. Look
Assistant Examiner—Igor Kershteyn
(74) Attorney, Agent, or Firm—Scott L. Harper; Carstens & Cahoon LLP

(57) ABSTRACT

Operation of a system for injecting a predetermined amount of a secondary fluid into a primary fluid stream. The system uses a liquid additive injection pump driven by a fluid powered motor that is driven by the primary fluid stream and can be selectively suspended by an on/off switch mechanism. The fluid powered motor includes a housing enclosing a differential pressure piston assembly having a piston movable within housing between upstroke and down stroke positions; a valve mechanism establishing a differential pressure within the housing to produce movement of the piston; an over-center mechanism coupled to the valve mechanism to toggle the valve mechanism between open and closed positions; and an actuating shall coupled to the over-center mechanism.

6 Claims, 5 Drawing Sheets

ON/OFF SWITCH FOR LIQUID ADDITIVE INJECTION PUMP

FIELD OF THE INVENTION

The present invention relates generally to a liquid additive injection pump powered by a fluid motor driven by a primary fluid stream to which the liquid additive is to be injected. More specifically, the present invention relates to a mechanism to selectively suspend injection of the liquid additive.

BACKGROUND OF THE INVENTION

Fluid powered motors driving an additive injection pump connected to a source of fluid additives are typically installed in a line containing primary fluid under pressure. The primary fluid produces reciprocating movement of a piston assembly within a housing of the fluid motor. The fluid motor in turn reciprocates a piston within a cylinder of the additive injection pump to draw a quantity of secondary fluid into the primary fluid. Such devices have been applied to add medication to drinking water for poultry and livestock, treat water with additives, add fertilizer concentrate to irrigation water, or add lubricant or cleaning agents to water. In liquid additive injection pumps, such as that shown in U.S. Pat. No. 4,558,715, reciprocating movement of the piston assembly is produced by a valve mechanism operable to establish a differential pressure. Specifically, opening and closing of the valve mechanism synchronized to the upstroke and down stroke positions of the piston assembly produces a pressure differential that moves the piston through its reciprocating cycle. Opening and closing of the valve mechanism is synchronized to the piston assembly by an over-center mechanism, which is actuated coincident with the piston assembly reaching the ends of its upstroke and down stroke positions. The over-center mechanism is spring-biased and serves to toggle the valve mechanism open and closed when an actuating shaft carried by the piston assembly engages stops that define the ends of its upstroke and down stroke excursions.

SUMMARY OF THE INVENTION

The present invention provides a system to inject a secondary fluid into a primary fluid. The system includes a fluid powered motor driven by a primary fluid stream. The fluid motor in turn drives a liquid additive injection pump to meter a secondary fluid. The fluid powered motor is provided with an on/off switch to suspend injection of the secondary fluid into the primary fluid by suspending operation of the fluid powered motor. In a system wherein the fluid powered motor has a reciprocating piston assembly movable in response to a differential pressure established by toggling of a valve mechanism, the position of an actuating shaft serving as a triggering stop for an over-center mechanism can be selectively offset by an on/off switch mechanism such that the piston assembly reaches the end of its upstroke excursion prior to the valve mechanism being toggled. Without the valve mechanism being toggled, reciprocating movement of the piston assembly is suspended because a differential pressure to move the piston in the down stroke excursion cannot be established. As a consequence, the liquid additive injection pump is not driven and injection of the secondary fluid is suspended.

The on/off switch mechanism may be provided as an extension of the actuating shaft. Further, the on/off switch mechanism may include a cam mechanism to axially displace the actuating shaft into an offset position. The cam mechanism may include a handle for ease of manipulation by an operator. The handle may be provided in a manner so as to assume first and second positions corresponding to the "on" and "off" positions of the switch mechanism by being thrown from side-to-side through a 180 degree arc. A visual indicator of the condition of the on/off switch mechanism may also be provided. Such a visual indication may be provided by indicia, such as a color, disposed on a portion of the actuating shaft that protrudes through the surface of the housing when the shaft is displaced into the offset position.

The on/off switch mechanism may comprise a sleeve disposed on the top of the fluid motor housing and an insert axially movable relative to the sleeve. A handle actuated cam mechanism is coupled to the insert to move the insert relative to the sleeve such that the insert is displaced to assume a retracted position when the switch mechanism is in the "off" position and a fully inserted position when the switch mechanism is in the "on" position. The insert is coupled to the actuator shaft such that when the insert is retracted relative to the sleeve the actuator shaft is moved to the offset position and the reciprocating piston reaches the end of its upstroke excursion without an engagement of a stop on the actuating shaft that triggers the over-center mechanism to toggle the valve mechanism. As a consequence, reciprocating movement of the piston is arrested.

DETAILED DESCRIPTION

Figure 1:
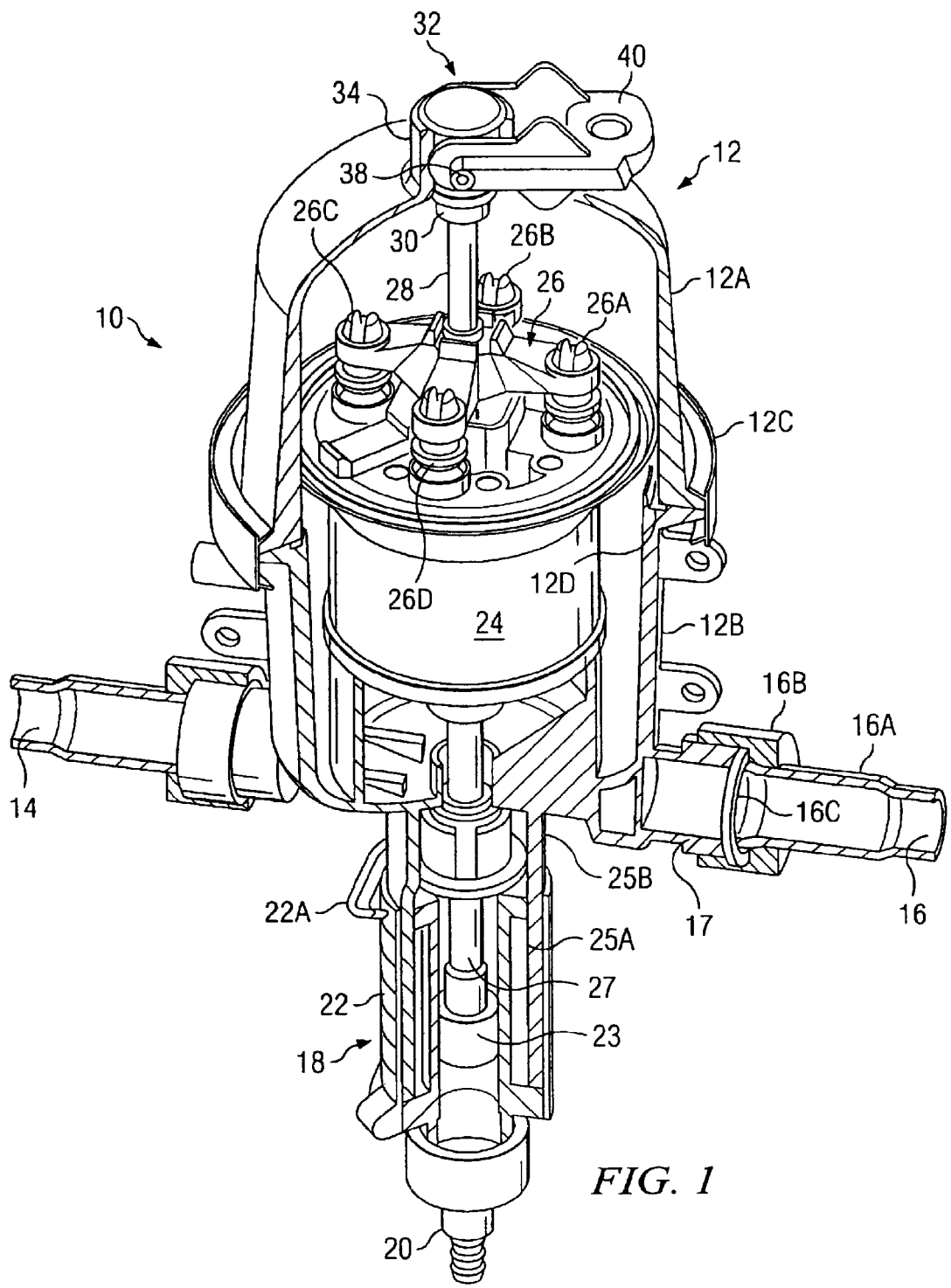
FIG. 1 is a cut-away illustration of a fluid motor powered liquid additive injection pump provided with an on/off switch to suspend reciprocating movement of the piston assembly of the fluid powered motor.

In FIG. 1, a fluid powered motor 10 is shown. A housing 12, including cover 12A and lower body 12B, which are connected by clamp 12C and O-ring 12D, encloses the fluid powered motor components. An inlet conduit 14 provides for acceptance of a primary fluid stream and outlet conduit 16 discharges the primary fluid stream. The outlet conduit 16 includes an adapter 16A and gasket 16C held with a nut 16B to an outlet port 17 in lower body 12B. Coupled to fluid powered motor 10 is liquid additive injection pump 18. An inlet conduit having a fitting 20 provides for acceptance of a liquid additive. The liquid additive is drawn into pump 18 from an additive reservoir (not shown) and injected into the primary fluid stream. Metering of the liquid additive is adjustable by ratio adjustment sleeve 22 and locking pin 22A. Liquid additive injection pump 18 includes a dosage piston 23, which is movable within inner cylinder 25A and outer cylinder 25B by connecting piston rod 27. The fluid powered motor 10 is coupled to the connecting piston rod 27 to drive the liquid additive injection pump.

The internal components of the fluid powered motor 10 within housing 12 include a piston assembly 24. A valve mechanism 26 is carried on piston assembly 24 and includes poppet valves 26A–26D. An actuator shaft 28 extends through piston assembly 24 and is coupled to an over-center mechanism (not shown) that actuates valve mechanism 26. Opening and closing of valve mechanism 26 at the upstroke and down stroke positions of the piston creates a differential pressure within housing 12 effective to produce reciprocating movement of piston assembly 24. The internal components of fluid powered motor 10 constitute what is termed a "differential pressure reciprocating piston assembly".

At the top of housing 12 is on/off switch mechanism 32. A sleeve 34 extends from the top of housing 12. An insert 36 (not shown) is axially movable relative to sleeve 34 by actuation of a cam mechanism 38 using handle 40. The handle rotates through an arc of 180 degrees as it is thrown from side-to-side between the "on" and "off" positions of the switch mechanism 32. The switch mechanism 32 is shown in the "on" position in FIG. 1. In the "on" position of the switch mechanism, the insert 36 is fully inside sleeve 34. The insert 36 is coupled to actuator shaft 26 to establish the vertical position of the shaft relative to the housing cover 12A.

Figure 2:
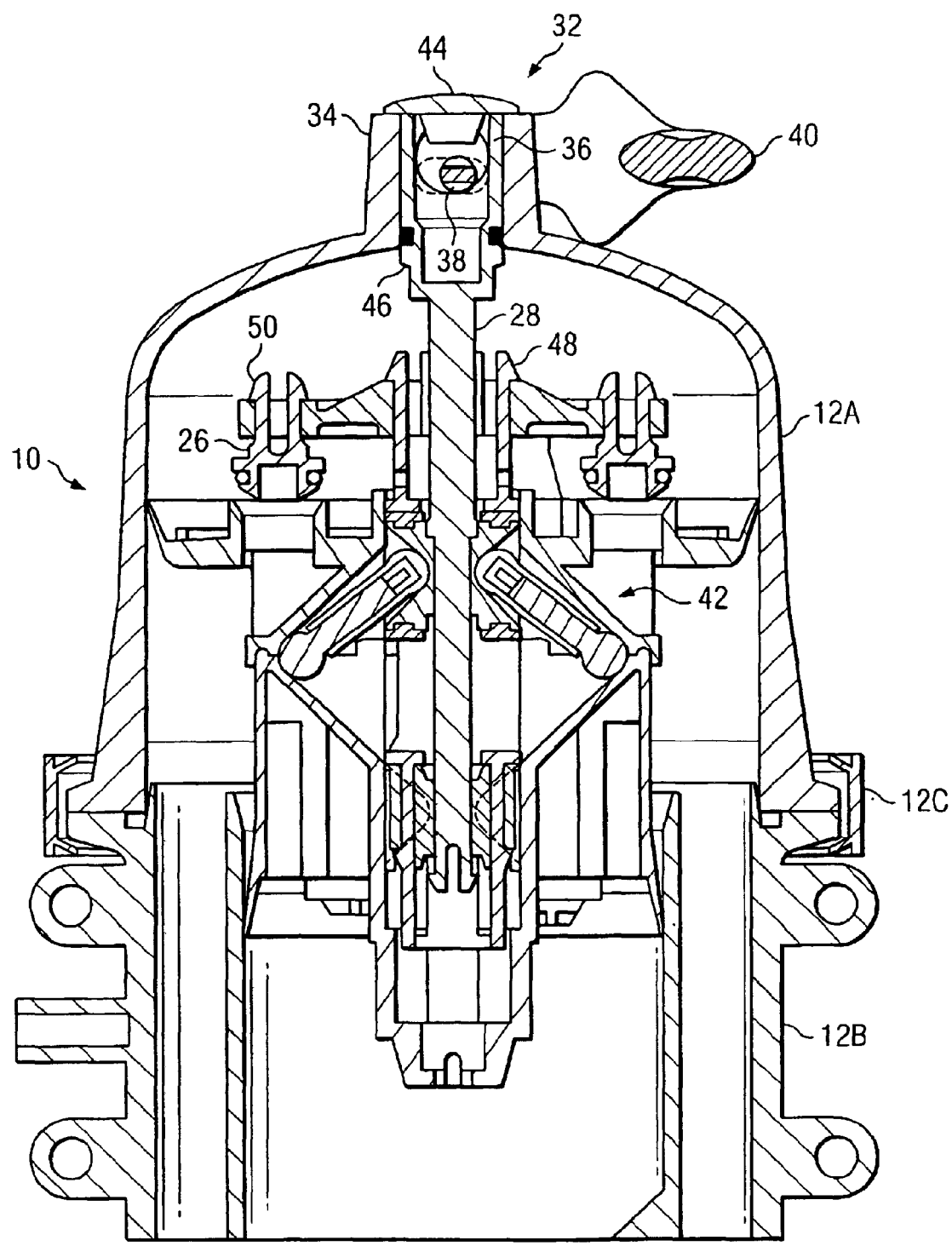
FIG. 2 is a vertical cross-section illustration of the fluid powered motor portion of the liquid additive injection pump of FIG. 1 wherein the on/off switch mechanism is in the "on" position and there is normal operation of the reciprocating piston assembly of the fluid powered motor to the end of its upstroke excursion, which results in the valve mechanism being toggled by the over-center mechanism.

Referring next to FIG. 2, fluid powered motor 10 is shown in a cross-sectional view that includes the over-center mechanism 42, which is not in view in FIG. 1. Also illustrated in FIG. 2 is the coupling of actuator shaft 28 to insert 36. In the illustrated embodiment, the actuator shaft 28 and the insert 36 are integrally formed as a single unit. Further, as shown, a cap 44 sits atop insert 36. When the switch mechanism is in the "off" position, protrusion of the actuator shaft 28 from the housing cover 12A provides visual indicia of the condition of the switch mechanism as being "off." The portion of actuator shaft 28 that protrudes from housing cover 12A may be colored, such as in red, to assist in providing the visual indicia of the condition of the switch mechanism.

As seen in FIG. 2, actuator shaft 28 includes a circumferential shoulder 46, which is aligned to be engaged by collar extension 48 on piston assembly 24. As will be appreciated, when piston assembly 24 moves in the upstroke excursion, inner collar extension 48 will engage shoulder 46. Upon collar extension 48 engaging shoulder 46, valve mechanism 26 is moved to the closed position and the over-center mechanism 42 is triggered to toggle into a position that maintains closure of the valve mechanism. Upon closure of the valve mechanism, a differential pressure is created that causes the piston assembly to begin moving in the down stroke excursion portion of its reciprocating cycle. In the position of actuator shaft 28 shown in FIG. 2, the range of movement of the piston assembly to the end of its upstroke permits the over-center mechanism to fully toggle. As will also be appreciated, the over-center mechanism forms a bi-stable device that establishes the valve mechanism alternately in open and closed positions. With the actuator shaft 28 in the position shown in FIG. 2, normal operation providing reciprocating movement of the piston assembly 24 can continue.

Figure 3:
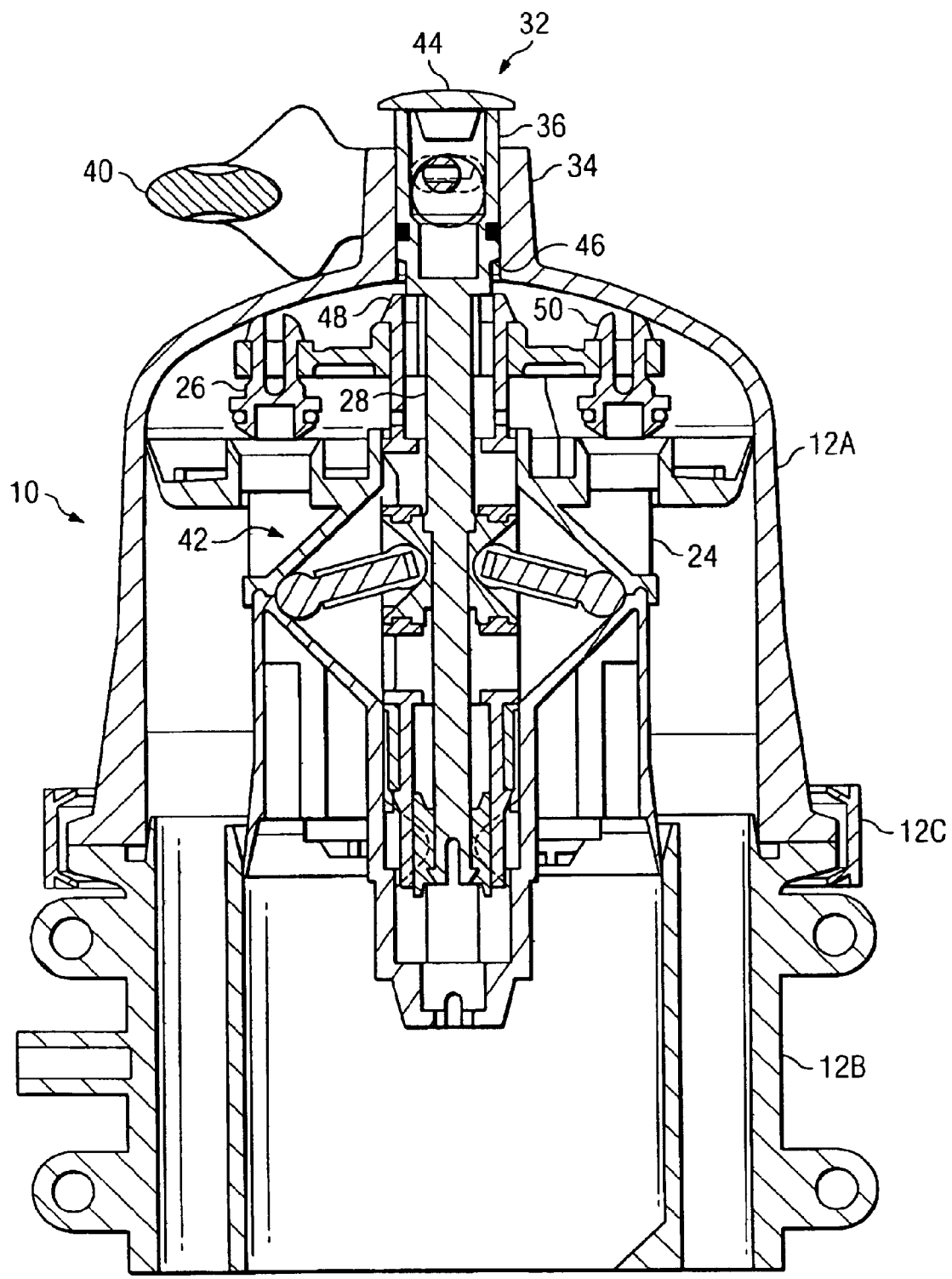
FIG. 3 is a vertical cross-section illustration of the fluid motor portion of the liquid additive injection pump of FIG. 1 wherein the on/off switch mechanism is in the "off" position and normal operation of the reciprocating piston assembly of the fluid motor is suspended.

In FIG. 3, the handle of the on/off switch mechanism 32 has been moved to the "off" position. As seen, the insert 36 and the attached actuator shaft 28 are displaced to the offset position. As will be appreciated, when piston assembly 24 moves in the upstroke excursion, inner collar extension 48 cannot engage shoulder 46 because the outer collar extension 50 will engage the top of housing cover 12A ahead of time. As a consequence, valve mechanism 26 will not close to create the differential pressure within housing 12 that is necessary to move piston assembly 24 in the down stroke excursion portion of its reciprocating cycle. Also, although over-center mechanism 42 will be partially moved, as seen in FIG. 3, it will not fully toggle. With the actuator shaft 28 is the position shown in FIG. 3, normal reciprocating movement operation of the piston assembly 24 will not continue and liquid additive will no longer be injected into the primary fluid stream. Upon movement of handle 40 to the "on" position, however, the inner collar extension 48 will engage shoulder 46 on actuator shaft 28. The valve mechanism will close and the over-center mechanism will complete toggling. The necessary differential pressure required for reciprocating movement of piston assembly 24 will be re-established within housing 12 and normal operation will resume.

Figure 4:
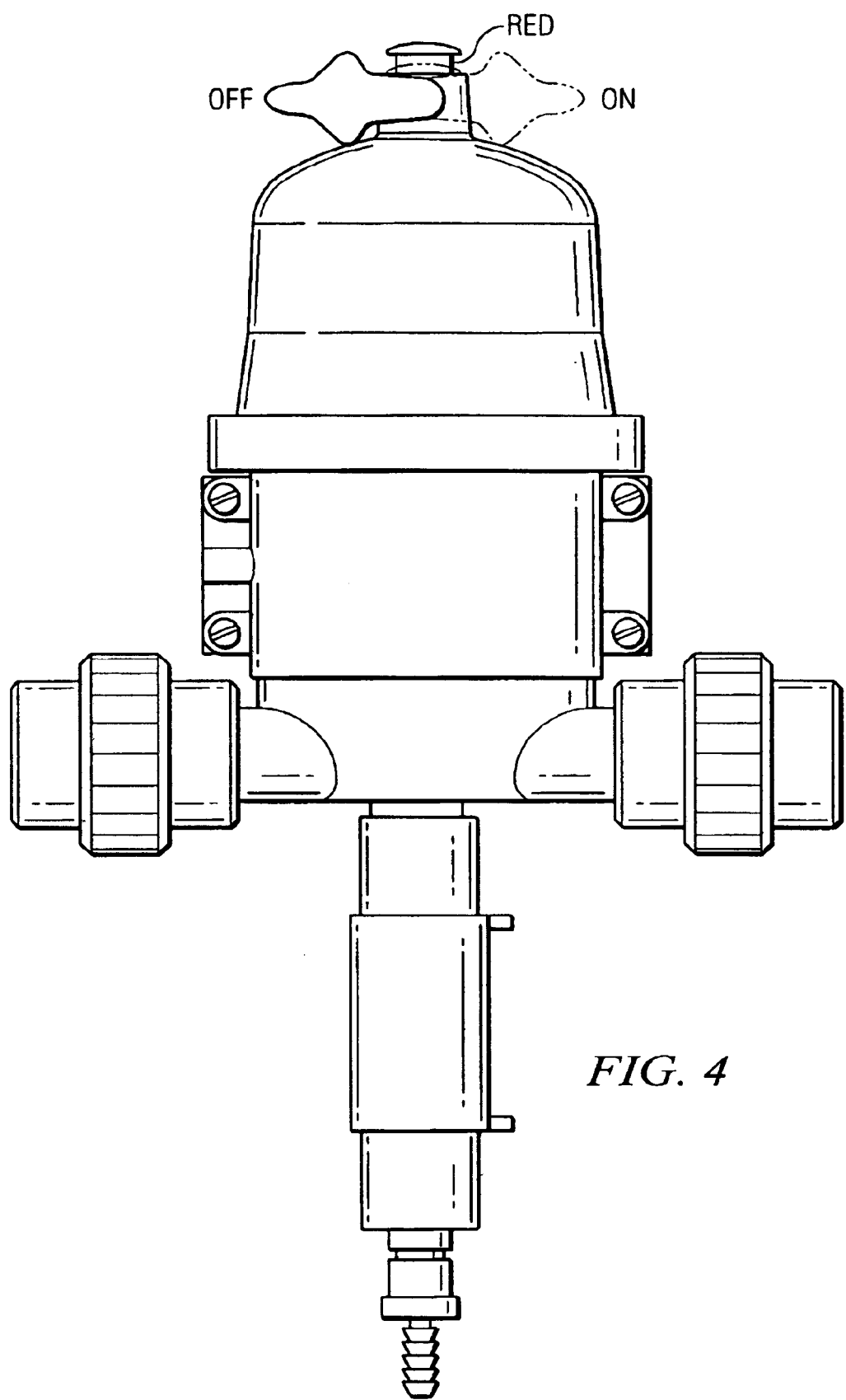
FIG. 4 is an illustration of the on/off switch mechanism mounted atop a fluid powered motor driven liquid additive injection pump and showing the visual indicia that the switch mechanism is in the "off" position.

FIG. 4 provides an illustration of a fluid motor powered liquid additive injection pump provided with an on/off switch mechanism in accordance with the present invention. As shown, the switch mechanism is mounted atop the housing of the fluid powered motor. In the close-up details also shown in FIG. 4, the switch mechanism is shown in the "on" and "off" positions. Further shown in FIG. 4 is that when the switch mechanism is in the "off" position the insert 36 at the upper end of the actuator shaft 28 protrudes from the housing. Moreover, a visual indication in the form of a color (i.e., red) is provided on the insert to signify the "off" condition of the switch mechanism to the user/operator. When the switch mechanism is in the "on" position, the insert does not protrude from the housing and the color indicator is not visible.

Figure 5:
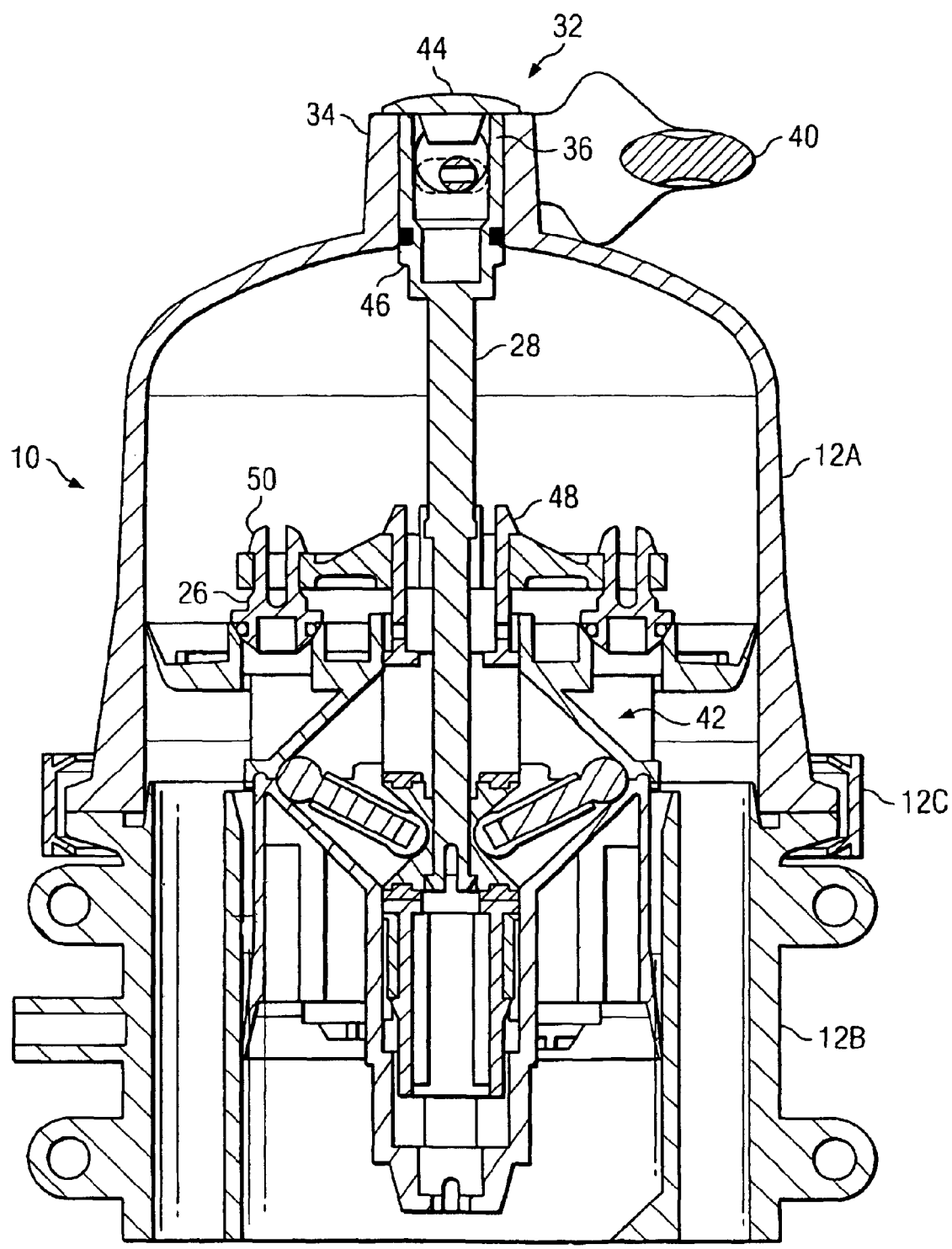
FIG. 5 is a vertical cross-section illustration of the fluid powered motor portion of the liquid additive injection pump of FIG. 1 wherein the on/off switch mechanism is in the "on" position and there is normal operation of the reciprocating piston assembly of the fluid motor to the end of the down stroke excursion.

FIG. 5 shows the down stroke position of the piston assembly 24 when the on/off switch mechanism 32 is in the "on" position. As will be noted, the valve mechanism 26 has the poppet valves closed in the seated position. Also, the over-center mechanism 42 is in the opposite bi-stable condition to that shown in FIG. 2.

Although a specific embodiment of the invention has been set forth herein for purposes of explanation and illustration. It is to be understood, however, that various alterations, substitutions, and modifications may be made to the embodiment described herein without departing from the spirit and scope of the invention as set forth in the appended claims.

What is claimed is:

1. A system to inject a secondary fluid into a primary fluid, comprising:
   a fluid powered motor driven by a primary fluid stream;
   a liquid additive injection pump driven by the fluid powered motor; and
   an on/off switch mechanism coupled to the fluid powered motor to selectively
   suspend operation of the fluid powered motor;
   wherein the fluid powered motor comprises:
   (a) a piston movable within a housing between upstroke and down stroke positions;

(b) a valve mechanism establishing a differential pressure within the housing to produce movement of the piston;

(c) an over-center mechanism coupled to the valve mechanism to toggle the valve mechanism between open and closed positions; and (d) an actuating shaft coupled to the over-center mechanism, the actuating shaft including a piston upstroke stop that causes toggling of the valve mechanism at an upstroke position of the piston during normal reciprocating movement of the piston;

further wherein the on/off switch mechanism axially displaces the actuating shaft relative to the housing wherein the piston upstroke stop assumes an offset position when the on/off switch mechanism is in the "off" position such that the piston upstroke stop can not be engaged to cause toggling of the valve mechanism when the piston reaches its upstroke position.

2. The system of claim 1 wherein the on/off switch mechanism axially displaces the actuating shaft relative to the housing wherein the piston upstroke stop assumes its normal position when the on/off switch mechanism is in the "on" position such that the piston upstroke stop can be engaged to cause toggling of the valve mechanism when the piston reaches its upstroke position.

3. A system to inject a secondary fluid into a primary fluid, comprising:

a fluid powered motor driven by a primary fluid stream;

a liquid additive injection pump driven by the fluid powered motor; and an on/off switch mechanism coupled to the fluid powered motor to selectively suspend operation of the fluid powered motor; wherein the fluid powered motor comprises:

(a) a piston movable within a housing between upstroke and down stroke positions;

(b) a valve mechanism establishing a differential pressure within the housing to produce movement of the piston;

(c) an over-center mechanism coupled to the valve mechanism to toggle the valve mechanism between open and closed positions; and (d) an actuating shaft coupled to the over-center mechanism, the actuating shaft including a piston upstroke stop that causes toggling of the valve mechanism at an upstroke position of the piston during normal reciprocating movement of the piston;

wherein the on/off switch mechanism axially displaces the actuating shaft relative to the housing wherein the piston upstroke stop assumes an offset position when the on/off switch mechanism is in the "off" position such that the piston upstroke stop can not be engaged to cause toggling of the valve mechanism when the piston reaches its upstroke position;

wherein the on/off switch mechanism axially displaces the actuating shaft relative to the housing wherein the piston upstroke stop assume its normal position when the on/off switch mechanism is in the "on" position such that the piston upstroke stop can be engaged to cause toggling of the valve mechanism when the piston reaches its upstroke position; and further wherein the on/off switch mechanism comprises a cam mechanism actuated by a handle, the cam mechanism being coupled to the actuating shaft.

4. A system to inject a secondary fluid into a primary fluid, comprising:

a fluid powered motor driven by a primary fluid stream;

a liquid additive injection pump driven by the fluid powered motor; and an on/off switch mechanism coupled to the fluid powered motor to selectively suspend operation of the fluid powered motor;

wherein the fluid powered motor comprises a housing enclosing a differential pressure reciprocating piston assembly that includes an actuating shaft providing a piston upstroke stop during normal operation and wherein the on/off switch mechanism axially displaces the actuating shaft relative to the housing such that (a) the piston upstroke stop assumes its normal position when the on/off switch mechanism is in the "on" position and can be engaged when the piston reaches its upstroke position and (b) the piston upstroke stop assumes an offset position when the on/off switch mechanism is in the "off" position and can not be engaged when the piston reaches its upstroke position.

5. A system to inject a secondary fluid into a primary fluid, comprising:

a fluid powered motor driven by a primary fluid stream;

a liquid additive injection pump driven by the fluid powered motor; and an on/off switch mechanism coupled to the fluid powered motor to selectively suspend operation of the fluid powered motor;

wherein the fluid powered pump comprises a housing enclosing a differential pressure reciprocating piston assembly that includes an actuating shaft providing a piston upstroke stop during normal operation and wherein the on/off switch mechanism axially displaces the actuating shaft relative to the housing such that (a) the piston upstroke stop assumes its normal position when the on/off switch mechanism is in the "on" position and can be engaged when the piston reaches its upstroke position and (b) the piston upstroke stop assumes an offset position when the on/off switch mechanism is in the "off" position and can not be engaged when the piston reaches its upstroke position; and further wherein the on/off switch mechanism comprises a cam mechanism actuated by a handle, the cam mechanism being coupled to the actuating shaft.

6. A method of suspending operation of a fluid motor powered liquid additive injection pump having a housing enclosing a differential pressure reciprocating piston assembly that includes an actuating shaft providing a piston upstroke stop during normal operation, comprising the step of:

axially displacing the actuating shaft relative to the housing such that the piston upstroke stop assumes an offset position relative to its position during normal operation and cannot be engaged when the differential pressure reciprocating piston assembly reaches its upstroke position;

wherein the step of axially displacing the actuating shaft relative to the housing comprises rotating a handle actuated cam mechanism coupled to the actuating shaft.

* * * * *